No. 841,257. PATENTED JAN. 15, 1907.
M. C. A. LATOUR.
CONTROL OF ALTERNATING CURRENT MOTORS.
APPLICATION FILED NOV. 9, 1905.

WITNESSES.

INVENTOR:
Marius C. A. Latour,

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

CONTROL OF ALTERNATING-CURRENT MOTORS.

No. 841,257.  Specification of Letters Patent.  Patented Jan. 15, 1907.

Application filed November 9, 1905. Serial No. 286,509.

*To all whom it may concern:*

Be it known that I, MARIUS C. A. LATOUR, a citizen of France, residing at Paris, France, have invented certain new and useful Improvements in Control of Alternating-Current Motors, of which the following is a specification.

My invention relates to the control of alternating-current motors of the type known as "compensated" series motors; and its object is to provide a novel arrangement for motors of this type whereby they are enabled to operate sparklessly above synchronism.

The "compensated" series motor, by which term is understood in the art a series motor having a winding on the field structure arranged and connected to produce a magnetomotive force, neutralizing the armature, self-induction, and reaction, operates very poorly above synchronism as regards sparking.

My invention consists in connecting the motor-armature in a closed circuit with a source of voltage of proper phase for producing a current for producing a commutating field. The commutating field thus produced improves the commutation of the motor, so as to render it possible to run the motor at speeds greatly above synchronism.

More specifically stated, in order to obtain the proper phase of the current in the local circuit I employ a source of voltage having one component dependent in phase on the impressed voltage and the other dependent in phase on the motor-currents. By properly adjusting the magnitude of these two components a voltage of the proper phase and amount in the closed circuit may be obtained.

In order to avoid the necessity of employing auxiliary apparatus, such as a series transformer, to obtain the component voltage in the local circuit dependent in phase on the motor-currents, my invention further consists in forming the local circuit by establishing a connection from the armature-terminal not already connected to the motor-field through a source of voltage to a point on the field-winding. By thus including a portion of the field-winding in the local circuit the component voltage dependent in phase on the motor-current is obtained, the effect being electrically the same as though a series transformer were employed for this purpose.

My invention will best be understood by reference to the accompanying drawings, in which—

Figure 1:
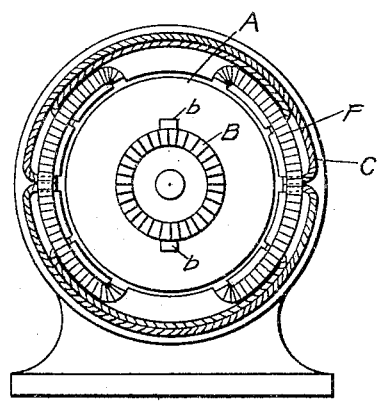
Figure 2:
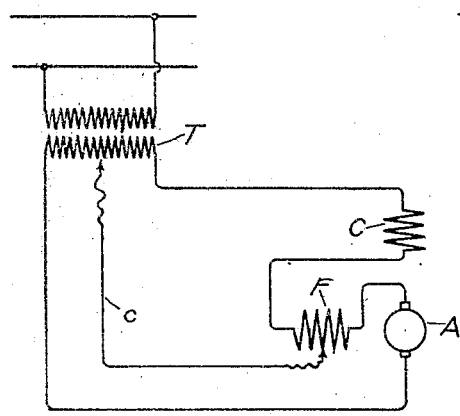
Figure 3:
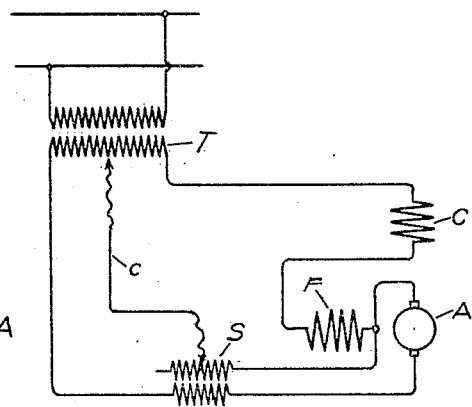

Figure 1 shows diagrammatically a compensated series motor, this being the type of motor to which my invention relates. Fig. 2 is a diagram showing the circuit connections for operation in accordance with my invention, and Fig. 3 shows a modified arrangement of circuit connections.

In the drawings, A represents the motor-armature, F the field, and C the compensating winding. The armature is provided with the usual commutator B and brushes $b\ b$. All three windings are connected in series in the usual manner. The field-winding F produces a field at right angles to that produced by the armature-currents, and the compensating winding C produces a field in line with the armature reaction, so as to neutralize the armature reaction and self-induction in the manner well understood in the art.

In Fig. 2, T represents a transformer or other suitable source of alternating current. $c$ represents a connection established between an intermediate point on the secondary of transformer T and an intermediate point of the field-winding F. By means of this connection a local circuit is formed, including the armature of the motor, a portion of the secondary of transformer T, and a portion of the field-winding F. In other words, the armature A is included in a closed circuit with a source of voltage of which one component—viz., that produced by the secondary of transformer T—is in phase with the voltage impressed on the motor, while the other component—viz., the voltage across the portion of the field-winding F included in the closed circuit—is dependent in phase upon the current in the motor. This latter component lags substantially ninety degrees behind the motor-current, since this voltage is produced by and is consequently ninety degrees behind the flux interlinked with the field-winding F, and this flux is in phase with the motor-current. If these two components are selected with proper relative magnitude—that is, if the proper proportion of turns of the transformer T and of the field-winding F are included in the closed circuit—a resultant voltage will be produced in the closed circuit which will be of the proper phase for producing, with the induced voltage in the motor-armature, a current in the closed circuit which will produce a commutating field of the proper phase and amount for enabling the motor to operate sparklessly at any given speed within limits. By varying the two components of the voltage in the closed circuit the motor may be adjusted for substantially sparkless commutation over widely-varying speeds above synchronism.

The phase of the voltage desired in the closed circuit, consisting of the armature, the portion of the field, and the portion of the transformer T, will appear from the following considerations: In the ordinary compensated series motor the sparking is due to the electromotive force induced in a coil short-circuited by a brush by the alternating field of the motor. This field is in phase with the motor-current and the electromotive force induced by this field in the short-circuited coil lags ninety degrees behind it—that is, the voltage that produces the commutation troubles lags ninety degrees behind the motor-current. Consequently in order to secure perfect commutation it is necessary to induce in the short-circuited coil a second electromotive force which must be opposite in phase to the first and which must consequently also be ninety degrees out of phase with the motor-current. Since this electromotive force is to be produced dynamically by the short-circuited coil cutting the commutating field, it will be in phase with the commutating field. Consequently it is desired to produce a commutating field which is ninety degrees out of phase with the motor-currents. Since the closed circuit through which the current which produces the commutating field flows is highly inductive, this current, which produces the commutating field, will lag substantially ninety degrees behind the voltage which produces it, and since this current, which produces the commutating field, must be ninety degrees behind the main motor-current, the voltage which produces it must be in phase with, or rather in opposition to, the main motor-current. The voltage which produces the current which in turn produces the commutating field is resultant voltage formed by three components—namely, the counter electromotive force of rotation of the armature, the electromotive force across the terminals of the portion of the field-winding included in the local closed circuit, and the electromotive force across the terminals of that portion of the secondary of transformer T which is included in the closed circuit. Of these three the counter electromotive force of rotation developed in the armature is in phase with the main motor-field, and consequently with the main motor-current—that is, it is of the same phase with the desired resultant voltage. This counter electromotive force, however, is fixed by the field strength of the motor and the speed of rotation, and consequently it cannot be adjusted as desired for varying speeds. The other two voltages—namely, the potential across the portion of the field-winding and across the portion of the transformer, the first of which is displaced ninety degrees from the main motor-current, as has been heretofore explained, and the second of which is in phase with the impressed voltage, and consequently out of phase with the main motor-current by an angle corresponding to the angle of lag of the main motor-current—may be so proportioned that these two components will give a resultant in phase with, or rather in opposition to, the main motor-current. Consequently the resultant of the three voltages is in opposition to the main motor-current, which is the phase relation desired, and since two of the components are adjustable the resultant voltage may be adjusted for the desired value and still maintained at the proper phase. It will be seen that since this current which produces the commutating field flows through a portion of the field-winding F, and is substantially ninety degrees out of phase with the main motor-current, it will produce a certain shifting of the phase of the field produced by the winding F, and this shifting somewhat modifies the phase relations as stated above. This variation, however, may easily be taken account of in adjusting the relative proportions of the voltages taken from the field-winding F and the transformer T in the local circuit.

While the connections which I have described above for obtaining a component voltage if the closed circuit dependent in phase on the motor-circuit obviate the necessity of using any additional apparatus, nevertheless it is obvious that such a component voltage may be obtained in other ways if desired. Thus in Fig. 3 a series transformer S is employed for this purpose, and it will be seen that this arrangement is electrically the equivalent of Fig. 2, since the secondary voltage is substantially ninety degrees out of phase with the primary current and varies with variation in the magnitude of the primary current.

What I claim as new, and desire to secure by Letters Patent of the United States, is—

1. In combination with a compensated series motor for alternating currents, a local circuit comprising the motor-armature and a source of voltage of proper phase for producing in said local circuit a current for producing a commutating field.

2. In combination with a compensated series motor for alternating currents, a local circuit comprising the motor-armature and a source of voltage having one component dependent in phase on the impressed voltage and a second component dependent in phase on the motor-current.

3. In combination with a compensated series motor having one armature-terminal connected directly to one field-terminal, a connection from the other armature-terminal through a source of voltage to a point on the field-winding.

4. In combination with a compensated series motor for alternating currents, a local circuit comprising the motor-armature and a source of voltage having one component in phase with the impressed voltage and a second component dependent in phase on the motor-current.

5. In combination with a compensated series motor for alternating currents, a local circuit comprising the motor-armature and a source of voltage having one component in phase with the impressed voltage and a second component dependent in phase on the motor-current, and means for adjusting the relative magnitudes of said components.

6. In combination with a compensated series motor having one armature-terminal connected directly to one field-terminal, a connection from the other armature-terminal through a source of voltage to a point on the field-winding, and means for shifting said point on the field-winding.

In witness whereof I have hereunto set my hand this 8th day of November, 1905.

MARIUS C. A. LATOUR.

Witnesses:
BENJAMIN B. HULL,
MARGARET E. WOOLLEY.